(12) United States Patent
Chang (10) Patent No.: US 10,201,246 B2
(45) Date of Patent: Feb. 12, 2019

(54) MULTIFUNCTION COOKING DEVICE

(71) Applicant: Tsann Kuen (Zhangzhou) Enterprise Co., Ltd., Zhangzhou (CN)

(72) Inventor: Wenyu Chang, Zhangzhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 333 days.

(21) Appl. No.: 15/018,246

(22) Filed: Feb. 8, 2016

(65) Prior Publication Data
US 2016/0235247 A1  Aug. 18, 2016

(30) Foreign Application Priority Data
Feb. 17, 2015 (CN) .................... 2015 2 0113878 U (51) Int. Cl.
*A47J 37/06* (2006.01)
(52) U.S. Cl.
CPC .................. *A47J 37/0611* (2013.01)
(58) Field of Classification Search
CPC .... A47J 37/0611; A47J 27/04; A47J 37/0676; A47J 2037/0617; A47J 27/12
See application file for complete search history.

(56) References Cited

U.S. PATENT DOCUMENTS

| 3,457,852 | A | * | 7/1969 | Kwoh | A47J 37/10 220/23.86 |
|---|---|---|---|---|---|
| D268,981 | S | * | 5/1983 | Monson | 426/243 |
| 5,782,165 | A | * | 7/1998 | Glenboski | A47J 27/004 219/401 |
| 6,024,014 | A | * | 2/2000 | Kasai | A47J 37/067 99/400 |
| 6,064,042 | A | * | 5/2000 | Glucksman | A47J 37/0676 219/452.13 |
| 6,389,961 | B1 | * | 5/2002 | Wu | A47J 37/0682 99/339 |
| 6,782,801 | B1 | * | 8/2004 | Correa | A47J 37/067 99/340 |
| 7,059,318 | B2 | * | 6/2006 | Cornfield | A47J 37/067 126/275 R |
| D538,584 | S | * | 3/2007 | Scholze | D7/359 |
| 7,475,630 | B2 | * | 1/2009 | Steinberg | A47J 37/0676 219/452.13 |
| 2001/0045422 | A1 | * | 11/2001 | Gouthiere | A47J 27/04 219/432 |
| 2004/0211406 | A1 | * | 10/2004 | Cornfield | A47J 37/067 126/274 |
| 2005/0005776 | A1 | * | 1/2005 | Steinberg | A47J 37/0676 99/331 |

(Continued)

*Primary Examiner* — Dana Ross
*Assistant Examiner* — Lawrence Samuels
(74) *Attorney, Agent, or Firm* — Brinks Gilson & Lione (57) ABSTRACT

A multifunction cooking device includes a base unit, a cooking pan, and a cover unit. The base unit includes a base seat that defines an annular receiving space, and a heating unit disposed in the base seat and surrounded by the annular receiving space. The cooking pan is disposed on the base unit, and includes a bottom wall contacting with the heating unit, and a surrounding wall transversely extending from the bottom wall and inserted into the annular receiving space. The cover unit is movably connected to the base unit and covers the cooking pan.

9 Claims, 10 Drawing Sheets

(56) References Cited

U.S. PATENT DOCUMENTS

2006/0289452 A1* 12/2006 Lequy .................. A47J 37/067
                                                        219/452.13
2007/0277678 A1* 12/2007 Mangano ............. A47J 37/0611
                                                        99/426
2010/0326417 A1* 12/2010 Groth ................. A47J 37/0713
                                                        126/25 R

* cited by examiner

MULTIFUNCTION COOKING DEVICE

CROSS-REFERENCE TO RELATED APPLICATION

This application claims priority to Chinese Application No. 201520113878.6, filed on Feb. 17, 2015.

FIELD

The disclosure relates to a cooking device, and more particularly to a multifunction cooking device.

BACKGROUND

Figure 1:
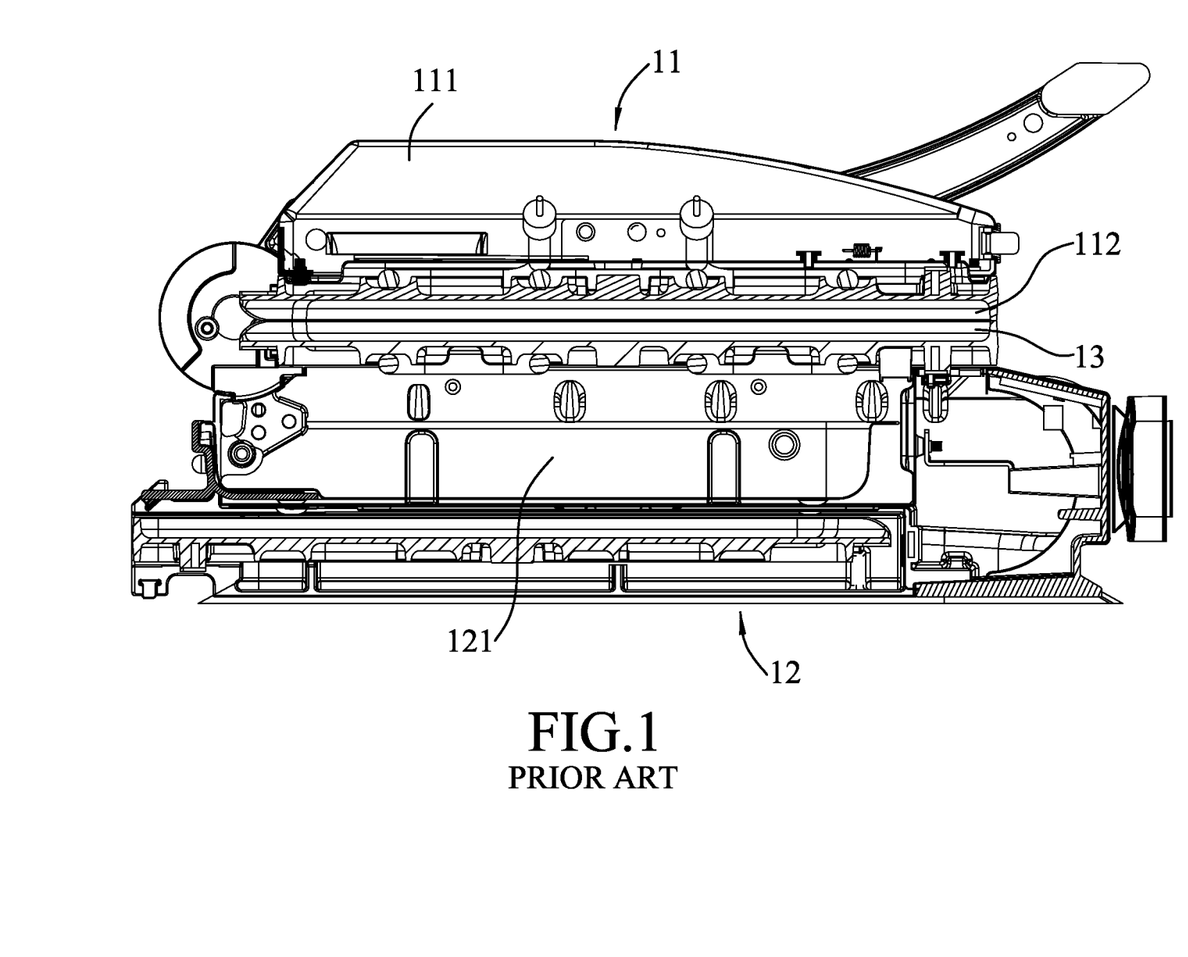
FIG. 1 is a partly sectional view of a conventional cooking device in a first state.
Figure 2:
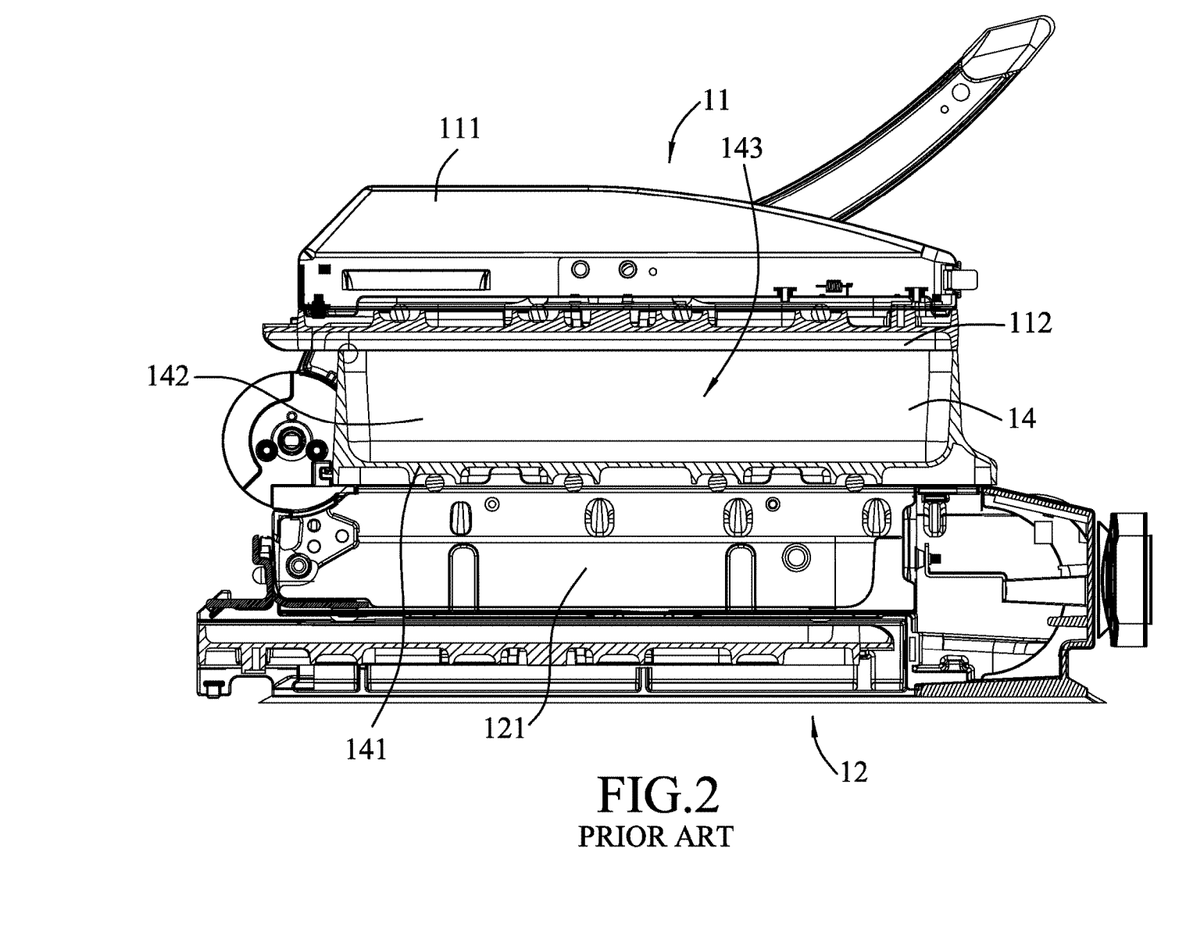
FIG. 2 is a partly sectional view of the conventional cooking device in a second state.

Referring to FIGS. 1 and 2, a conventional cooking device has abase unit 12 and a cover unit 11 connected to each other, a shallow pan 13 removably disposed between the cover and base units 11, 12, and a deep pan 14 removably disposed between the cover and base units 11, 12.

The base unit 12 includes abase seat 121. The cover unit 11 includes a cover seat 111 and a cover plate 112 disposed on the cover seat 111. The shallow pan 13 can be used for grilling food. The deep pan 14 has a bottom wall 141 and a surrounding wall 142 extending upwardly from the bottom wall 141. The bottom and surrounding walls 141, 142 cooperatively define a cooking space 143. The cooking space 143 can be used for stir-frying food or cooking a sauce.

The conventional cooking device is changeable between first and second states. In the first state, the cover unit 11 is located in close proximity to the base unit 12, the shallow pan 13 is disposed on the base unit 12, and the cover plate 112 abuts against the shallow pan 13. In the second state, the cover unit 11 is located distal from the base unit 12, the deep pan 14 is disposed on the base unit 12, and the cover plate 112 abuts against a top end of the surrounding wall 142 of the deep pan 14.

By virtue of the shallow and deep pans 13, 14, the conventional cooking device can have cooking functions of stir-frying, grilling, boiling, etc. However, the conventional cooking device can only accommodate or store one of the shallow and deep pans 13, 14, so that the other one of the shallow and deep pans 13, 14 has to be stored separately, thereby occupying a substantial space.

SUMMARY

Therefore, an object of the disclosure is to provide a multifunction cooking device that can alleviate the drawback of the prior art.

According to the disclosure, the multifunction cooking device includes a base unit, a cooking pan and a cover unit. The base unit includes a base seat that defines an annular receiving space, and a heating unit disposed in the base seat and surrounded by the annular receiving space. The cooking pan is disposed on the base unit and includes a bottom wall contacting with the heating unit, and a surrounding wall transversely extending from the bottom wall and inserted into the annular receiving space. The cover unit is movably connected to the base unit and covers the cooking pan.

BRIEF DESCRIPTION OF THE DRAWINGS

Other features and advantages of the disclosure will become apparent in the following detailed description of the embodiment with reference to the accompanying drawings, of which.

DETAILED DESCRIPTION

A multifunction cooking device 100 according to an embodiment of the present disclosure includes a cooking pan 2, a base unit 3, a cover unit 4, and a connection unit 5.

Figure 3:
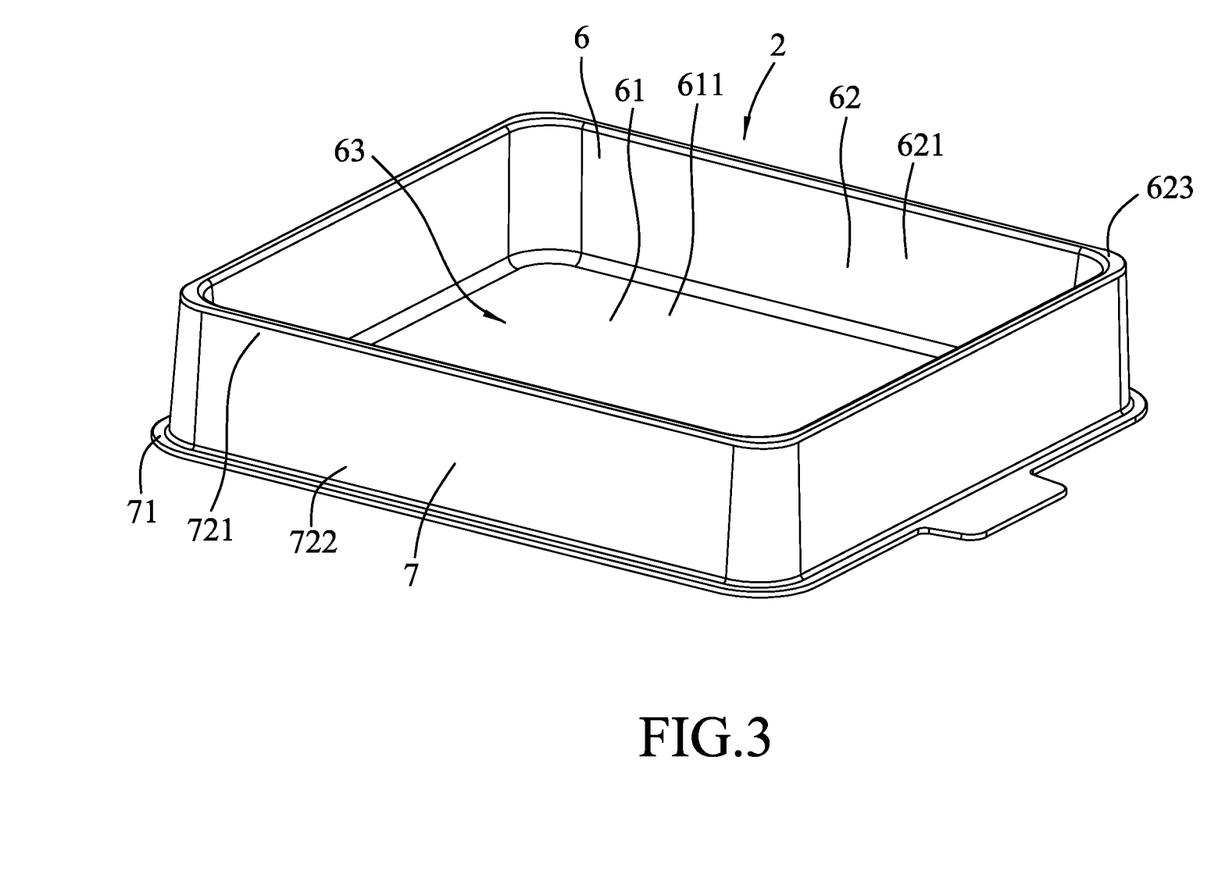
FIG. 3 is a perspective view of a cooking pan of a multifunction cooking device according to an embodiment of the present disclosure.
Figure 4:
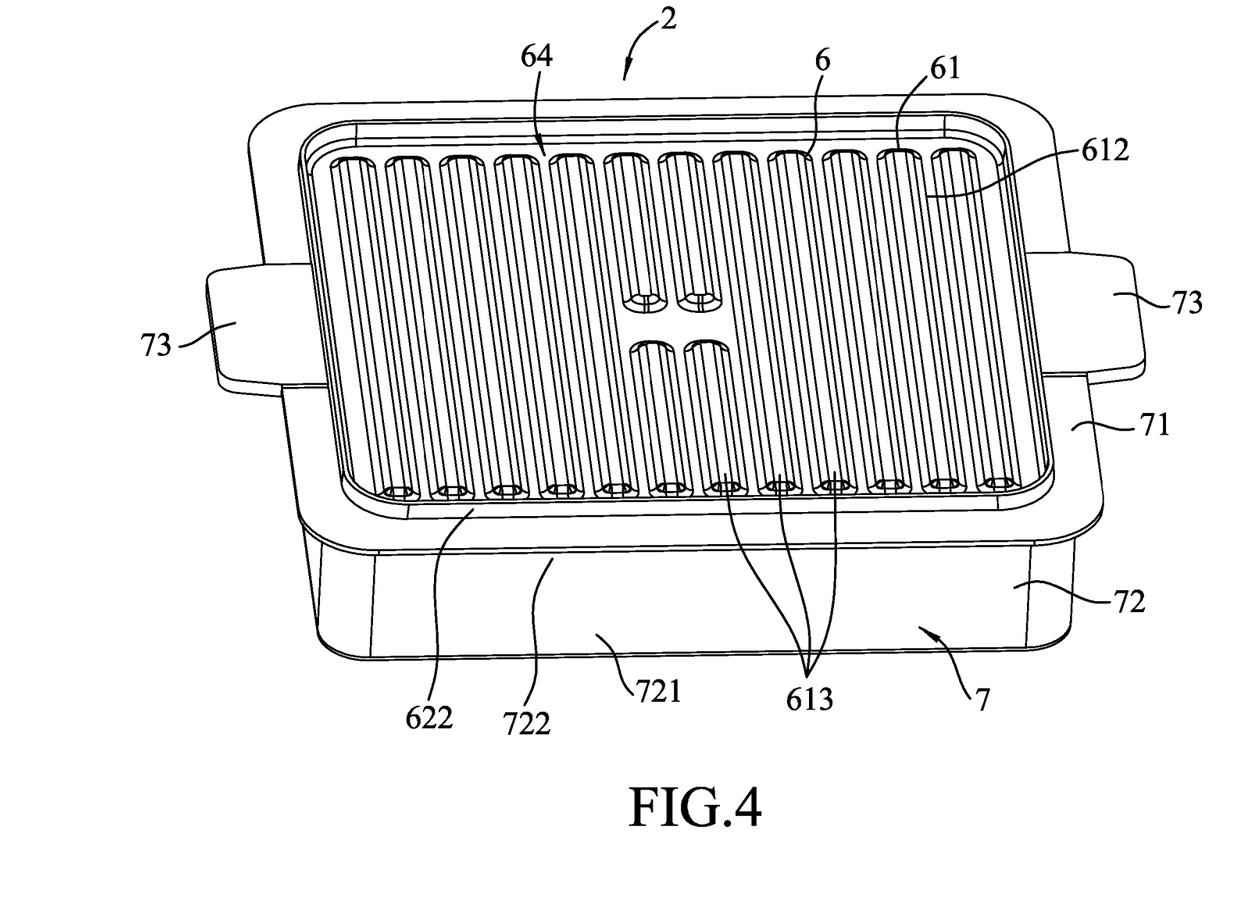
FIG. 4 is another perspective view of the cooking pan of the embodiment.
Figure 5:
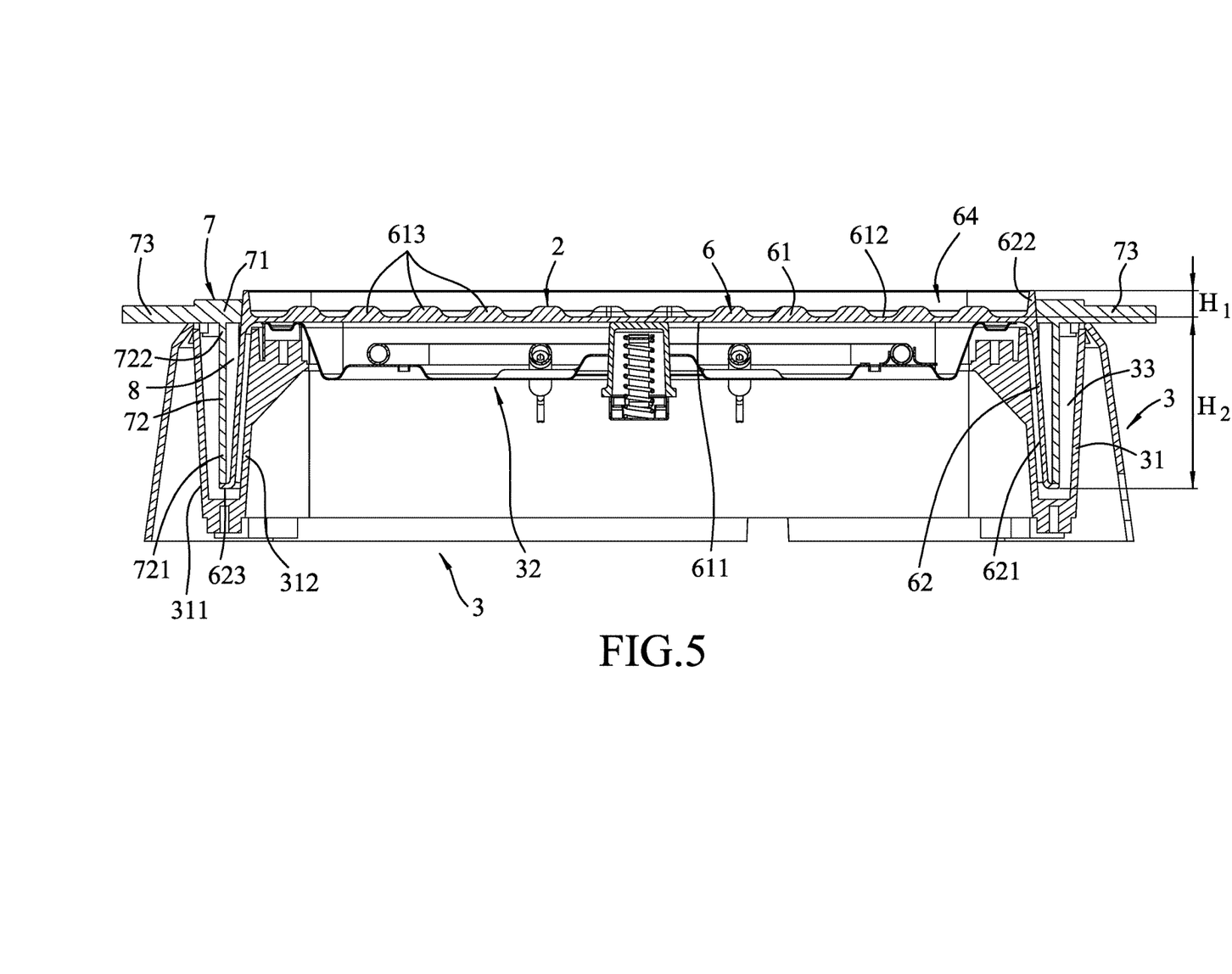
FIG. 5 is an assembled sectional view of the cooking pan and a base unit of the embodiment with a second cooking surface facing upwardly.

Referring to FIGS. 3 to 5, the cooking pan 2 is disposed between the base unit 3 and the cover unit 4 (see FIG. 6), and includes a pan body 6 and a scald-preventing frame 7.

The pan body 6 has a bottom wall 61 and a surrounding wall 62 transversely extending from the bottom wall 61. The bottom wall 61 has opposite first and second cooking surfaces 611, 612. The second cooking surface 612 has a plurality of spaced-apart ribs 613. The surrounding wall 62 has a first surrounding wall portion 621 extending from a periphery of the first cooking surface 611 in a direction away from the second cooking surface 612, and a second surrounding wall portion 622 extending from a periphery of the second cooking surface 612 in a direction away from the first cooking surface 611. The first surrounding wall portion 621 has a distal end 623 distal from the first cooking surface 611, and cooperates with the first cooking surface 611 to define a cooking space 63. Further, the first surrounding wall portion 621 extends outwardly and inclinedly from the bottom wall 61. The second surrounding wall portion 622 has a height ($H_1$) that extends from the second cooking surface 612 smaller than a height ($H_2$) of the first surrounding wall portion 621 extending from the first cooking surface 611 and that is about one-fifth of the height ($H_2$) of the first surrounding portion 621. In addition, the second surrounding wall portion 622 and the second cooking surface 612 cooperatively define a grilling space 64.

The scald-preventing frame 7 is disposed on an outer periphery of the surrounding wall 62, and includes an annular flange 71 that extends horizontally and that has an inner periphery connected to an outer periphery of the second surrounding wall portion 622, an upright wall 72 that extends transversely from the annular flange 71 in a direction similar to that of the first surrounding wall portion 621, and two grip members 73 provided on two opposite sides of the annular flange 71 for gripping by a user. The upright wall 72 has a first wall portion 722 that is connected to the annular flange 71 at a position proximate to the outer periphery of the second surrounding wall portion 622 and that is spaced apart from the first surrounding wall portion 621, and a second wall portion 721 having one end connected to the first wall portion 722 and the other end connected to the distal end 623 of the first surrounding wall portion 621. The upright wall 72, the annular flange 71 and the surrounding wall 62 cooperatively define a heat-insulating space 8. Since the contact area between the scald-preventing frame 7 and the pan body 6 is small, and the heat-insulating space 8 is capable of preventing heat transmission from the pan body 6 to the scald-preventing frame 7, the scald-preventing frame 7 can effectively prevent a user from being scalded, thereby enhancing safety and reliability of use of the present disclosure.

Figure 6:
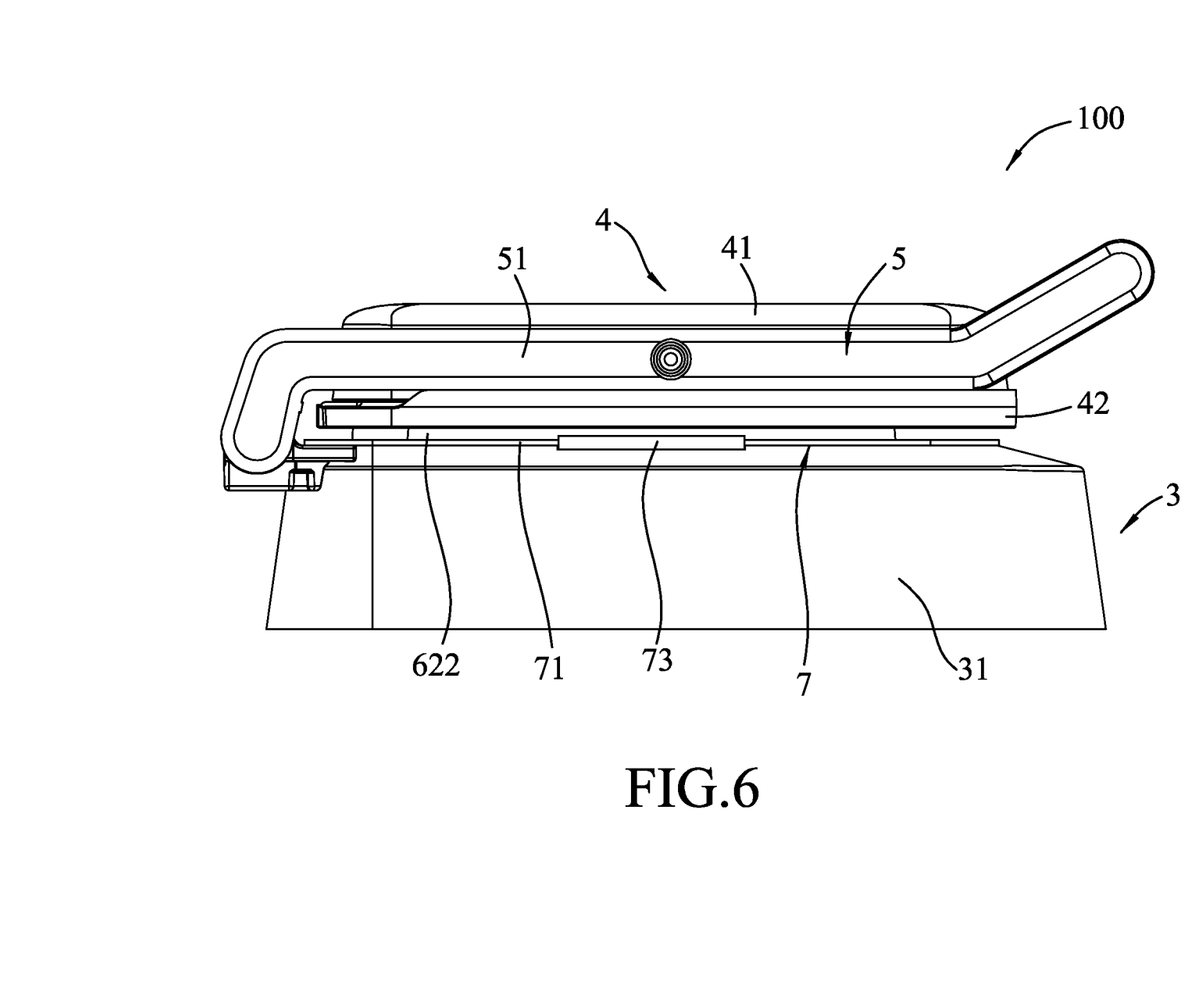
FIG. 6 is a side view of the embodiment, illustrating the multi function cooking device in a first state.
Figure 7:
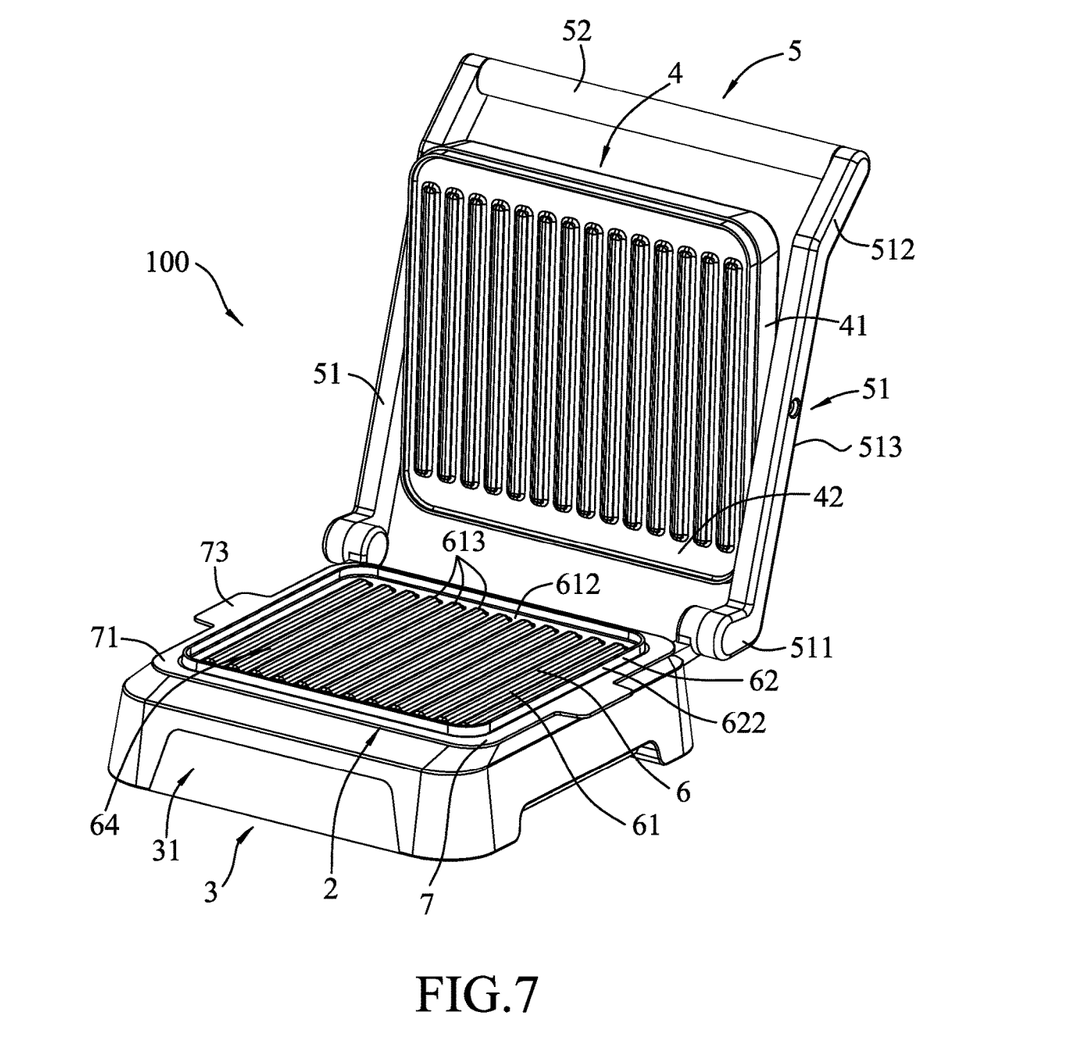
FIG. 7 is a perspective view of the embodiment, illustrating a cover unit of the multifunction cooking device in an opened position and the second cooking surface of the cooking pan facing upwardly.

Referring to FIGS. 6 and 7, in combination with FIG. 5, the base unit 3 includes a base seat 31 and a heating unit 32. The base seat 31 has inner and outer surrounding walls 312, 311 connected to each other at bottom ends thereof and cooperatively defining an annular receiving space 33 therebetween. The heating unit 32 is disposed in the base seat 31, and is surrounded by the annular receiving space 33.

The cover unit 4 is movably connected to the base unit 31, and includes a cover seat 41 and a cover plate 42 disposed on a bottom of the cover seat 41. The cover plate 42 is larger than the cooking pan 2, and removably covers and surrounds the cooking pan 2. Specifically, when the cover plate 42 covers the cooking pan 2, the distal end 623 of the first surrounding wall portion 621 is covered and surrounded by the cover plate 42, as shown in FIG. 6, or a distal end of the second surrounding wall portion 622 is covered and surrounded by the cover plate 42, as shown in FIG. 9.

The connection unit 5 interconnects the cover unit 4 and the base unit 3, and can position the cover unit 4 relative to the base unit 3. The connection unit 5 includes two spaced-apart connecting rods 51 having lower ends 511 respectively pivoted to two opposite sides of the base seat 31 at a rear end thereof, upper ends 512 opposite to the lower ends 511, and intermediate portions 513 each connected between one of the lower ends 511 and a corresponding upper end 512. The pull rod 52 is connected between the upper ends 512 of the connecting rods 51. The cover seat 41 is connected between the intermediate portions 513 of the pull rods 51. The user can grip the pull rod 52 to move the cover unit 4 away from the base unit 3 to facilitate changing of the multifunction cooking device 100 from a first state to a second state, and vice versa. In the first state, as shown in FIG. 6, the cover unit 4 is located in close proximity to the base unit 3. In the second state, as shown in FIG. 9, the cover unit 4 is located distal from the base unit 3.

To use the multifunction cooking device 100 for grilling, the first cooking surface 611 of the cooking pan 2 is first disposed to face downward, after which the first surrounding wall portion 621 is inserted into the annular receiving space 33, thereby completing the assembly of the cooking pan 2 and the base unit 3, as shown in FIG. 7. Sequentially, the food to be grilled (not shown) is placed on the second cooking surface 612 of the cooking pan 2, and the pull rod 52 is pulled to move the cover unit 4 downward to thereby place the multifunction cooking device 100 in the first state (see FIG. 6). In this state, the first cooking surface 611 contacts with the heating unit 32 to transmit heat to the second cooking surface 612, and the cover plate 42 of the cover unit 4 abuts against the distal end of the second surrounding wall portion 622 to cooperate with the second cooking surface 612 to grill the food (not shown) in the grilling space 64.

Figure 8:
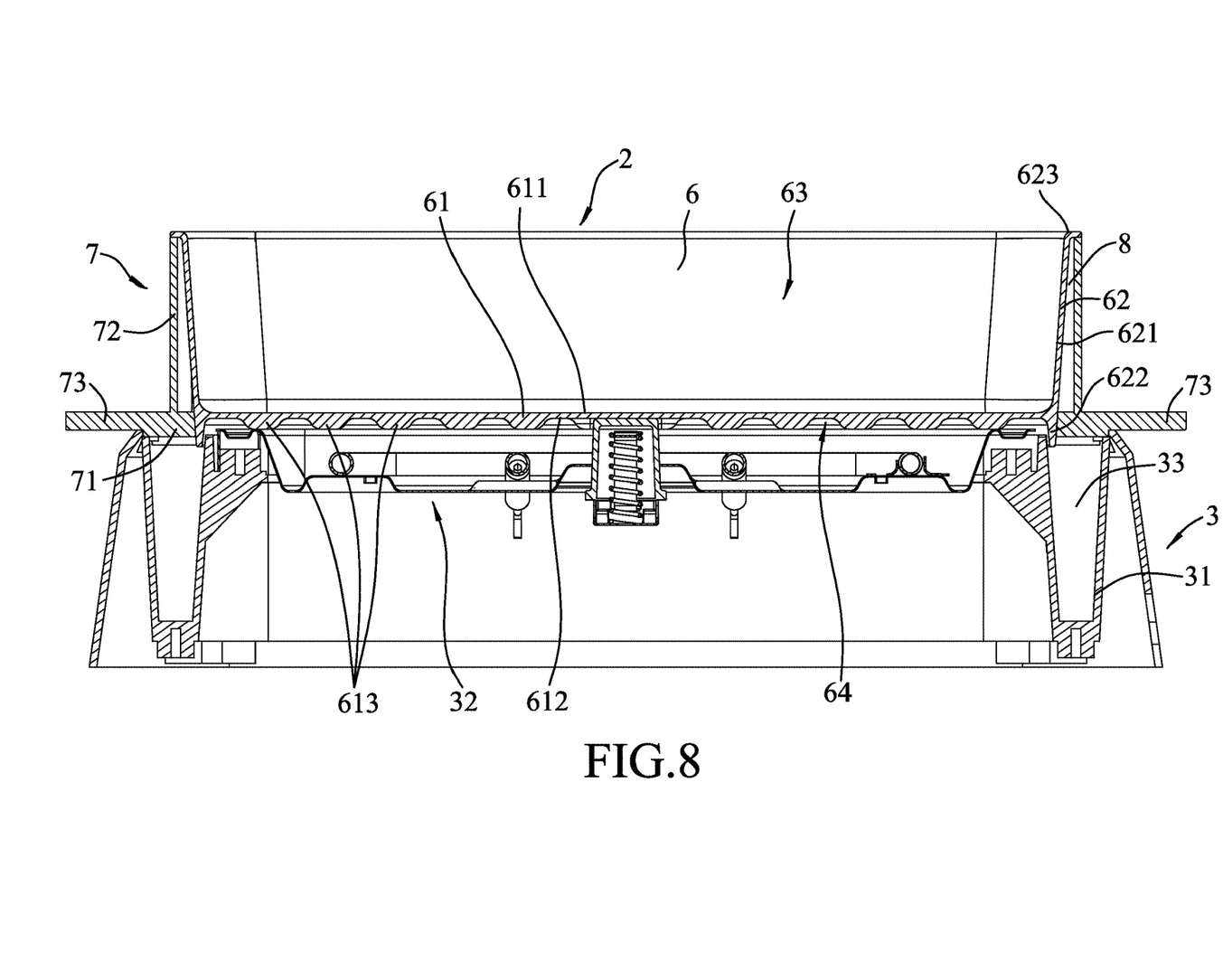
FIG. 8 is another assembled sectional view of the cooking pan and the base unit of the embodiment with a first cooking surface of the cooking pan facing upwardly.
Figure 9:
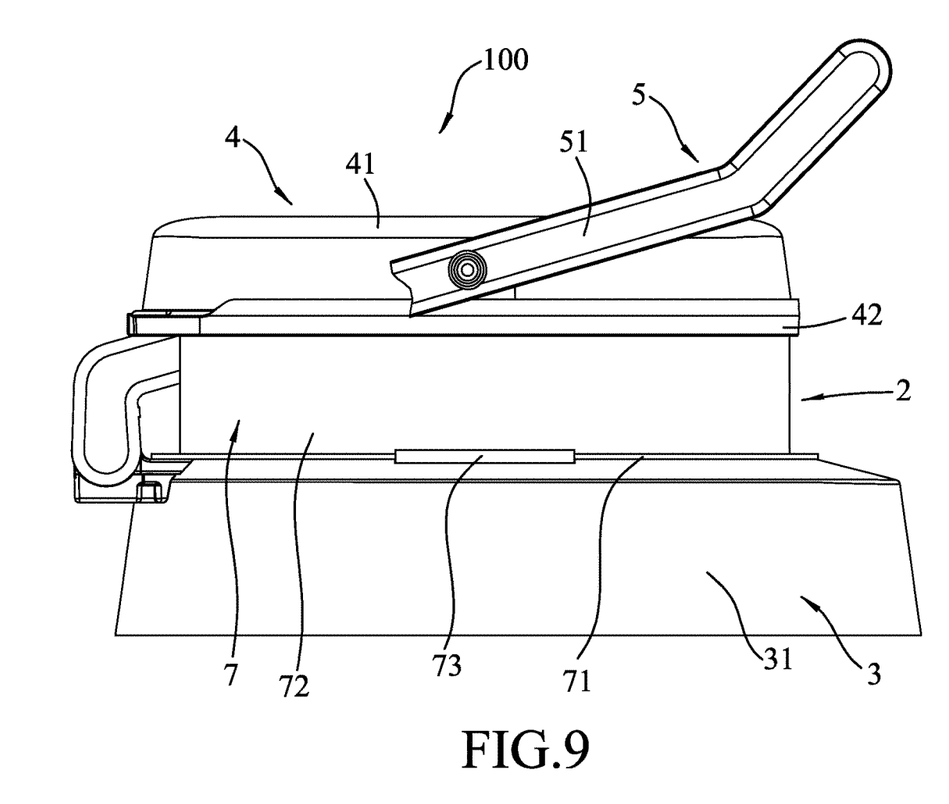
FIG. 9 is another side view of the embodiment, illustrating the multifunction cooking device in a second state.
Figure 10:
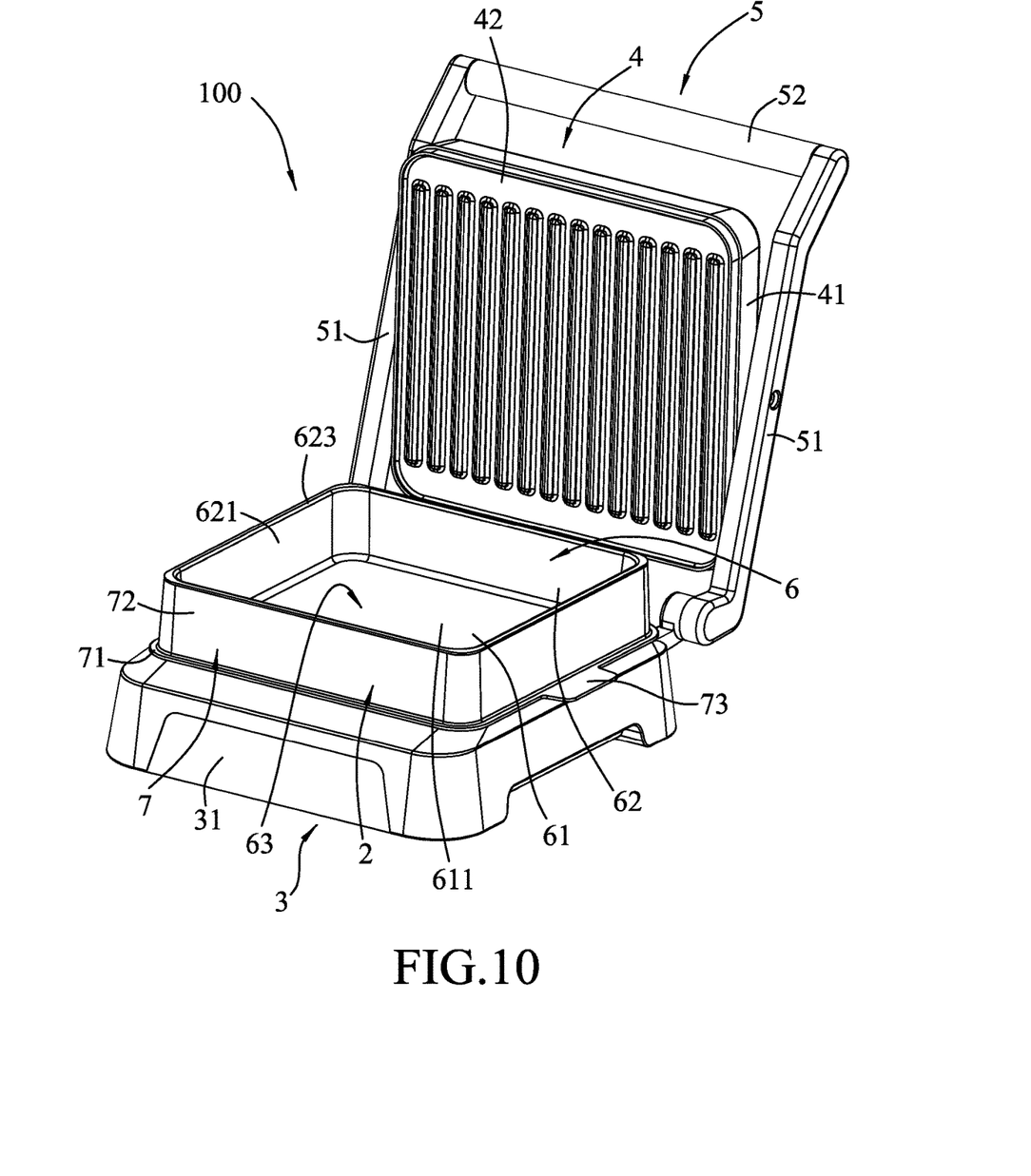
FIG. 10 is a view similar to FIG. 7, but illustrating the first cooking surface of the cooking pan facing upwardly.

Referring to FIGS. 8 to 10, to use the multifunction cooking device 100 for cooking sauce, soup, or stew, the second cooking surface 612 of the cooking pan 2 is first disposed to face downward, after which the second surrounding wall portion 622 is inserted into the annular receiving space 33, thereby completing the assembly of the cooking pan 2 and the base unit 3, as shown in FIG. 10. Sequentially, the ingredients (not shown) for cooking the sauce, soup or stew are placed on the first cooking surface 611 of the cooking pan 2, and the pull rod 52 is pulled to move the cover unit 4 downward to thereby place the multifunction cooking device 100 in the second state (see FIG. 9). In this state, the second cooking surface 612 contacts with the heating unit 32 to transmit heat to the first cooking surface 611, and the cover plate 42 of the cover unit 4 abuts against the distal end 623 of the first surrounding wall portion 621 to cover the cooking space 63. Due to the height ($H_2$) of the first surrounding wall portion 621 being greater than the height ($H_1$) of the second surrounding wall portion 622, the cooking space 63 defined by the first surrounding wall portion 621 and the first cooking surface 611 is deeper than the grilling space 64 defined by the second surrounding wall portion 622 and the second cooking surface 612, so that the sauce, soup or stew can be cooked in the cooking space 63.

To sum up, by virtue of the annular receiving space 33 defined by the inner and outer surrounding walls 312, 311 of the base seat 31, the first or second surrounding wall portion 621, 622 of the surrounding wall 62 can be inserted into the annular receiving space 33 and stored therein, so that there is no need to find a place for storing the cooking pan 2 when not in use. Hence, the multifunction cooking device 100 of the present disclosure can resolve the storage problem encountered in the prior art.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multifunction cooking device comprising:
    a base unit including a base seat and a heating unit disposed in said base seat, said base seat having a top end, a bottom end, an inner surrounding wall, and an outer surrounding wall that is spaced apart from and surrounds said inner surrounding wall, said inner and outer surrounding walls extending downwardly from said top end to said bottom end and cooperatively defining therebetween a loop-shaped receiving space, said heating unit being connected to said inner surrounding wall proximally to said top end and surrounded by said inner surrounding wall, said receiving space being open at said top end;

a cooking pan removably disposed on said base unit and including a bottom wall removably placed over said heating unit, and a surrounding wall connecting and surrounding said bottom wall and removably inserted into said receiving space, said bottom wall extending transversely inside said surrounding wall to divide a space bounded by said surrounding wall into a cooking space and a grilling space, and having opposite first and second cooking surfaces that respectively face said cooking space and said grilling space, said surrounding wall having a first surrounding wall portion and a second surrounding wall portion, said first surrounding wall portion and said first cooking surface cooperatively defining said cooking space, said second surrounding wall portion and said second cooking surface cooperatively defining said grilling space, said first and second surrounding wall portions having different heights measured from a plane of said bottom wall;

a cover unit movably connected to said base unit and covering said cooking pan; and said multifunction cooking device is changeable between a first state and a second state, wherein, when said multifunction cooking device is in the first state, said first cooking surface faces downward and toward said heating unit, and said first surrounding wall portion is inserted into said receiving space, and wherein, when said multifunction cooking device is in the second state, said second cooking surface faces downward and toward said heating unit, and said second surrounding wall portion is inserted into said receiving space.

2. The multifunction cooking device as claimed in claim 1, wherein:

said cover unit is located in close proximity to said base unit when said multifunction cooking device is in the first state, and said cover unit is located distal from said base unit when said multifunction cooking device is in the second state;

when said multifunction cooking device is in the first state, said second cooking surface faces said cover unit.

3. The multifunction cooking device as claimed in claim 2, wherein said second cooking surface has a plurality of spaced-apart ribs, and wherein, when said multifunction cooking device is in the second state, said first cooking surface faces said cover unit.

4. The multifunction cooking device as claimed in claim 2, wherein said first surrounding wall portion of said surrounding wall has a distal end distal from said first cooking surface, said cooking pan further including a scald-preventing frame disposed around said surrounding wall, said scald-preventing frame including a loop-shaped flange that has an inner periphery connected to an outer periphery of said surrounding wall, and an upright wall that extends transversely from said flange in a direction similar to that of said first surrounding wall portion, said upright wall having a first wall portion that is connected to said flange and that is spaced apart from said surrounding wall, and a second wall portion connected to said distal end of said first surrounding wall portion.

5. The multifunction cooking device as claimed in claim 4, wherein said first surrounding wall portion of said surrounding wall extends outwardly and inclinedly from said bottom wall.

6. The multifunction cooking device as claimed in claim 4, wherein said scald-preventing frame further includes a plurality of grip members provided on two opposite sides of said flange.

7. The multifunction cooking device as claimed in claim 4, wherein said upright wall, said flange and said surrounding wall cooperatively define a heat-insulating space.

8. The multifunction cooking device as claimed in claim 1, wherein said cover unit includes a cover plate that is larger than said cooking pan and that removably covers and surrounds said cooking pan.

9. The multifunction cooking device as claimed in claim 1, wherein the height of said second surrounding wall portion is smaller than the height of said first surrounding wall portion, said cooking space being deeper than said grilling space.

* * * * *